(12) United States Patent
Nelson (10) Patent No.: US 6,717,717 B2
(45) Date of Patent: Apr. 6, 2004

(54) DYNAMIC WAVELENGTH SHIFTING METHOD

(75) Inventor: Keith A. Nelson, Newton, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 2 days.

(21) Appl. No.: 09/906,530

(22) Filed: Jul. 16, 2001

(65) Prior Publication Data

US 2003/0011871 A1 Jan. 16, 2003

(51) Int. Cl.⁷ .............................. G02F 1/35; G02F 1/39
(52) U.S. Cl. ........................................ 359/326; 359/330
(58) Field of Search ................................. 359/326–332

(56) References Cited

U.S. PATENT DOCUMENTS

| 5,982,482 A | 11/1999 | Nelson et al. ............ 356/237.1 |
| 5,999,308 A | 12/1999 | Nelson et al. ............... 359/321 |
| 6,075,640 A | 6/2000 | Nelson ........................ 359/239 |

OTHER PUBLICATIONS

Nazarkin et al., "Generation of Multiple Phase–Locked Stokes and Anti–Stokes Components in an Impulsively Excited Raman Medium", Physical Review Letters, 83:13:2560–2563, Sep. 27, 1999.

Primary Examiner—John D. Lee
(74) Attorney, Agent, or Firm—Fish & Richardson P.C.

(57) ABSTRACT

Methods and systems are disclosed that dynamically shift the wavelength of an electromagnetic (EM) beam by interacting the beam with a polariton wave having a selected polariton wave frequency.

48 Claims, 5 Drawing Sheets

DYNAMIC WAVELENGTH SHIFTING METHOD

STATEMENT AS TO FEDERALLY SPONSERED RESEARCH

This invention was made with Government support under CHE-9713388 awarded by the National Science Foundation. The Government has certain rights in this invention.

FIELD OF THE INVENTION

The invention relates to the field of optics and optical processing. More particularly, the invention relates to a method of shifting the frequency of optical beam, e.g., a beam carrying a telecommunication signal.

BACKGROUND

Currently, many telecommunication networks send and receive information as optical signals over optical fiber networks. Such optical fiber networks generally provide significantly greater bandwidth than their electrical wire counterparts. One reason for this is that many optical networks presently use wavelength division multiplexing (WDM) techniques in which a single optical fiber can carry multiple (e.g., 80 or more) signals on different wavelength channels simultaneously. Currently, the wavelength channels are generally in the neighborhood of 1.55 microns, and different wavelength channels are separated by an amount on the order of 100 GHz (0.1 THz).

Even with such bandwidth, there can be bottlenecks at various nodes in the optical fiber network where incoming optical signals are rerouted among different pathways. In particular, when it is desired to route an incoming signal to a desired output pathway, the wavelength channel of the incoming optical signal may already be occupied in the desired output pathway. In such cases, the wavelength of the incoming signal needs to be shifted to an available channel or else the connection may be refused. One method for such wavelength shifting is to convert the incoming signal into an electrical signal and then convert the electrical signal into another optical signal using a source at the available wavelength channel. Such electrical conversion is cumbersome, however, and many researchers are looking to all-optical solutions where optical signals are switched directly among selected wavelengths to optimize bandwidth utilization in the network.

Similarly, outside of the telecommunication field, it is often desirable to shift the wavelength of an optical beam to facilitate downstream applications and/or processing. For example, such wavelength shifting is useful in spectroscopy, metrology, photomedicine, and laser-based materials processing.

SUMMARY

The invention features a method for shifting the wavelength of an input electromagnetic beam. The method involves generating a polariton wave at a selected frequency in a material supporting such waves, and interacting the input beam with the polariton wave to shift the wavelength (or equivalently, the frequency) by an amount corresponding to the polariton wave frequency. Polariton waves are dispersive and span a wide range of frequencies. Thus, they can be generated to have a selected frequency. Moreover, in many embodiments, the frequency of the polariton wave can be dynamically adjusted to produce a corresponding, tunable wavelength-shift in the input beam. For example, an external electric field may be applied the material supporting the polariton to dynamically adjust the polariton wave frequency. Furthermore, in some embodiments, the polariton wave is generated in a cavity in that resonantly supports the selected polariton wave frequency, and thereby enhances the efficiency, selectivity, and simplicity of the desired frequency shift.

The input electromagnetic beam may be a signal beam carrying information such as a telecommunication signal. For example, the beam may have a modulated intensity profile, such as sequence of pulses representing a digital bit stream. Alternatively, or in addition, the beam may have a modulated phase profile to carry the information. Furthermore, in many such embodiments, the coherent bandwidth of the signal beam is less than the wavelength shift.

In general, in one aspect, the invention features a method for shifting the frequency of an electromagnetic beam. The method includes: generating in a material a polariton wave having a polariton wave frequency; and directing the beam to interact with the polariton wave and cause at least portion of the beam to shift in frequency by an amount corresponding to the polariton wave frequency.

Embodiments of the method may include any of the following features.

The method may further include selecting the polariton wave frequency based on a desired frequency shift for the electromagnetic beam.

The method may further include adjusting the polariton wave frequency to cause a corresponding adjustment to the frequency shift. For example, the adjustment of the polariton wave frequency may include applying an external electric field to the material.

The method may further include adjusting the frequency shift by repeating the generating and directing steps for a polariton wave having a different polariton wave frequency corresponding to the adjusted frequency shift.

The method may further include allowing the polariton wave to propagate in the material prior to its interaction with the electromagnetic beam.

The method may further include introducing a delay between the generation of the polariton wave and its interaction with the electromagnetic beam.

The generation of the polariton wave may be selected to occur at a first spatial region of the material and the interaction between the polariton wave and the electromagnetic beam may be selected to occur at a different, second spatial region of the material.

The material may define a polariton wave cavity resonant with the polariton wave frequency. For example, the material may includes at least one constituent material having a transverse dimension sufficient to define the resonant cavity. Because of the cavity, the method may further include resonantly pumping the cavity to increase the intensity or frequency selectivity of the polariton wave. Furthermore, the method may further include selecting the polariton wave frequency by applying an external electric field to the material to adjust the effective cavity length of the resonant cavity. Also, the material may define an array of cavities each having a resonant polariton wave frequency. In such embodiments, the method may further include selecting a desired polariton wave frequency, and generating the polariton wave in the cavity corresponding to the desired polariton wave frequency.

The frequency-shift may equal the polariton wave frequency or a harmonic of the polariton wave frequency.

Furthermore, the frequency-shift may be selected to be positive or negative.

The electromagnetic beam whose frequency is being shifted may carry a telecommunication signal. For example, the electromagnetic beam may carry the telecommunication signal as a modulated intensity profile or a modulated phase profile. Furthermore, the electromagnetic beam carrying the telecommunication signal may have a coherent bandwidth that is less than the frequency shift. Also, the electromagnetic beam may include pulsed electromagnetic radiation or it may include continuous-wave (cw) or quasi-cw electromagnetic radiation.

The electromagnetic beam may be directed to the material by an optical waveguide.

The polariton wave frequency may be in the range of about 50 GHz to about 10 THz.

The electromagnetic beam may have a central wavelength in the range of about 300 nm to 2.5 microns.

The material may include a crystalline material, such as, for example, a ferroelectric or a semiconductor crystal. Furthermore, the material may non-centrosymmetric material.

The generation of the polariton wave may include optically exciting the material. For example, the optical excitation of the polariton wave may include directing at least one pulse of optical radiation to the material, wherein the optical pulse has a pulse duration shorter than the inverse of the polariton wave frequency, e.g., a pulse duration shorter than 10 ps. Alternatively, for example, the optical excitation of the polariton wave may include simultaneously directing at least two optical excitation beams to overlap in the material, wherein any two of the optical excitation beams differ in frequency by an amount equal to the polariton wave frequency.

The optical excitation of the polariton wave may include forming an optical excitation grating pattern in the material. For example, the formation of the optical excitation grating pattern may crossing a pair of optical excitation beams on the material. Alternatively, for example, the formation of the optical excitation grating pattern may include directing optical radiation to a mask and imaging at least a portion of the masked light into the material. In any case, the method may further include adjusting the period of the optical excitation grating pattern to select the polariton wave frequency.

The optical excitation of the polariton wave may also include coupling electromagnetic radiation at the polariton wave frequency into the material.

Alternatively, the excitation of the polariton wave may include directing at least one electrical pulse to the material, wherein the electrical pulse has a pulse duration shorter than the inverse of the polariton wave frequency.

To interact with the polariton wave, the beam whose frequency is to be shifted may be directed into the material supporting the polariton wave. Alternatively, it may be directed to a region proximate the material supporting the polariton wave.

In general, in another aspect, the invention features a method for shifting the frequency of an electromagnetic beam. The method includes: selecting a polariton wave frequency based on a desired frequency shift for the electromagnetic beam; generating in a material a polariton wave having the selected polariton wave frequency; and directing the beam to interact with the polariton wave and cause at least portion of the beam to shift in frequency by an amount corresponding to the polariton wave frequency.

In general, in another aspect, the invention features a method for shifting the frequency of an electromagnetic beam. The method includes: generating in a material a polariton wave having a polariton wave frequency; directing the beam to interact with the polariton wave and cause at least a portion of the beam to shift in frequency by an amount corresponding to the polariton wave frequency; and adjusting the polariton wave frequency to cause a corresponding adjustment to the frequency shift. For example, the adjustment of the polariton wave frequency may include applying an external electric field to the material. Moreover, the material may define a polariton wave cavity resonant with the polariton wave frequency.

In general, in another aspect, the invention features a method for shifting the frequency of an electromagnetic beam. The method includes: providing a material defining an array of polariton cavities each having a resonant polariton wave frequency; generating a polariton wave in the cavity corresponding to a selected polariton wave frequency; and directing the beam to interact with the polariton wave and cause at least a portion of the beam to shift in frequency by an amount corresponding to the polariton wave frequency.

Embodiments of the invention may have any of the following advantages.

The method may be used to facilitate all-optical, wavelength-shifting of photonic optical signals. In other words, the wavelength of an optical signal may be shifted without converting the optical signal to an electrical signal. Thus, such signals may be routed along a network pathway by switching the signal to an available wavelength channel at each of one or more legs of the pathway, thereby optimizing the use of the available network bandwidth. Moreover, the wavelength shift is tunable by generating the polariton wave to have a polariton wave frequency corresponding to the desired frequency shift. Furthermore, a cavity may used to resonantly enhance the polariton wave intensity and control the conversion efficiency of the desired wavelength shift. Also, in those embodiments in which the polariton is generated by optical excitation, that optical excitation may be spatially and/or temporally separated from the interaction between the polariton wave and the EM input beam whose wavelength is to be shifted. Thus, nonlinear interactions between the optical excitation used to generate the polariton wave and the input beam are minimized, if not prevented. Such nonlinear interactions may otherwise produce nonlinear effects (e.g., photorefractive damage) that corrupt that input beam and/or degrade the material supporting the polariton wave.

Other features, aspects, and advantages of the invention will be apparent from the following detailed description, and from the claims.

DETAILED DESCRIPTION

Polariton waves occur when electromagnetic (EM) radiation couples to polar material modes, e.g., a molecular vibration, optic phonon, or exciton, in a material. In such materials, EM waves drive the polar material modes and the polar material modes radiate EM waves, thus the EM waves and the polar material modes couple to one another to form a polariton wave, i.e., a wave having an EM component and a material component corresponding to a displacement along the polar material mode. In many cases the polariton wave involves many polar material modes, which all couple to EM radiation. The invention features method and systems that exploit polariton waves to dynamically shift the frequency of an input beam.

Figure 1:
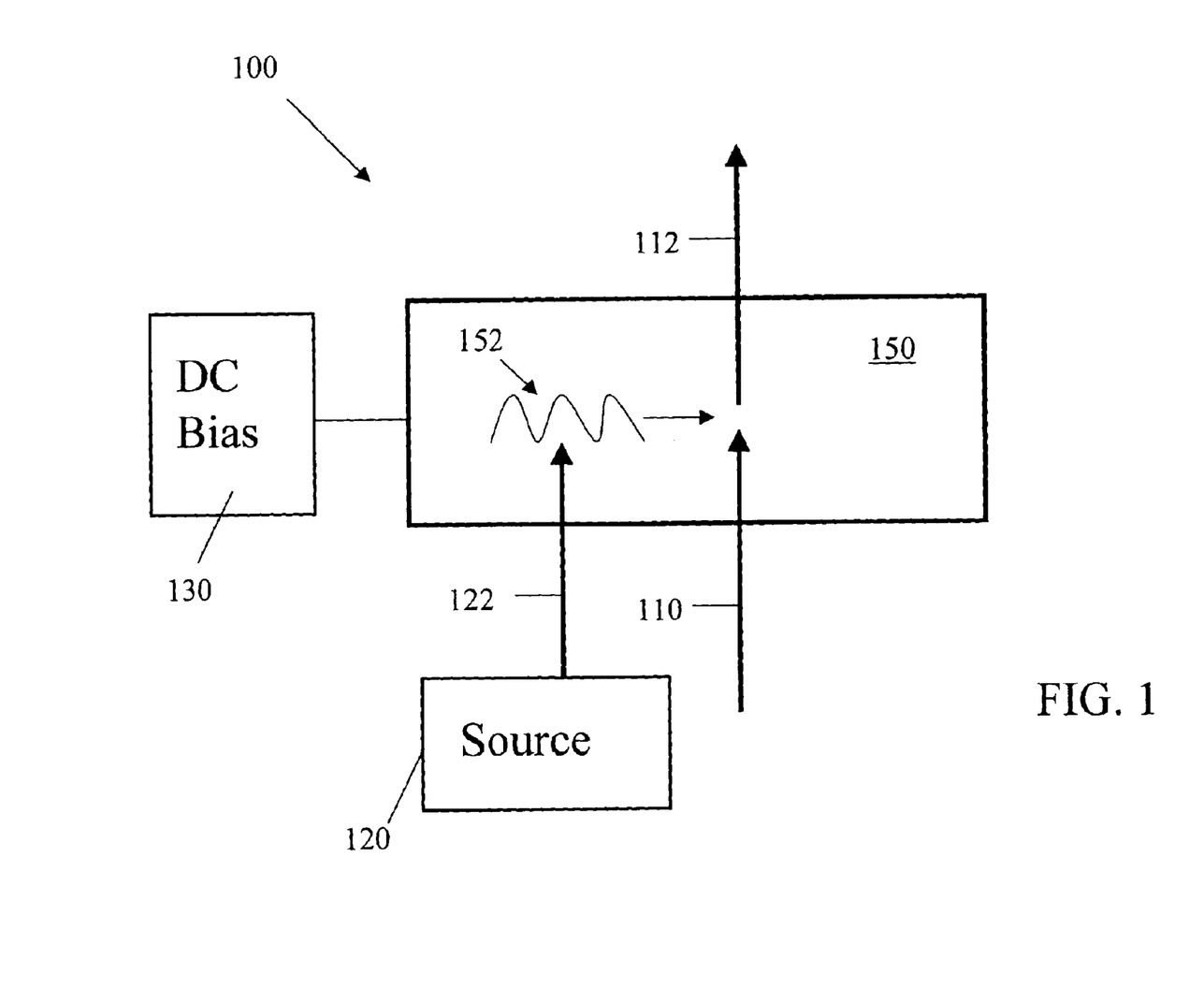
FIG. 1 is a schematic diagram of the wavelength-shifting method.

FIG. 1 is a schematic diagram of a system 100 for dynamically shifting the wavelength of an input signal beam 110 to produce wavelength-shifted output beam 112. System 100 includes an optical source 120 and a non-centrosymmetric crystalline material 150 (e.g., a lithium tantalite (LiTaO$_3$) crystal) that supports a polariton wave in the frequency range of about 10 GHz to about 10 THz. During operation, source 120 directs an optical excitation field 122 to material 150 and excites a polariton wave 152 therein, the polariton wave having frequency $\Omega$. Polariton wave 152 propagates within material 150 where it then interacts with input beam 110 to form wavelength-shifted beam 112. In the embodiment shown in FIG. 1, input beam 110 transmits through material 150 to form wavelength-shifted beam 112. In other embodiments, however, the wavelength-shifted beam may emerge as a reflected, scattered, or diffracted beam. If the frequency of input beam 110 is given by $\omega$, wavelength-shifted beam 112 includes at least one component whose frequency is shifted by the polariton frequency $\Omega$. Depending on the interaction geometry, wavelength-shifted beam 112 may include a component up-shifted by the polariton frequency, i.e., to frequency $\omega+\Omega$, and another component down-shifted by the polariton frequency, i.e., to frequency $\omega-\Omega$. Furthermore, when the intensity of the polariton wave is strong enough, the wavelength-shifted beam may include additional components whose frequency is shifted by multiples of the polariton frequency. Source 120 generates optical excitation field 122 to generate polariton wave 152 with a selected polariton wave frequency $\Omega$, and thereby control the frequency content of wavelength-shifted beam 112. This is possible because polariton waves are dispersive. Accordingly, they span a wide range of frequencies corresponding to different propagation wavevectors. A particular frequency may be selected by using an excitation field that generates the polariton wave at a wavevector corresponding to the desired frequency.

Figure 2:
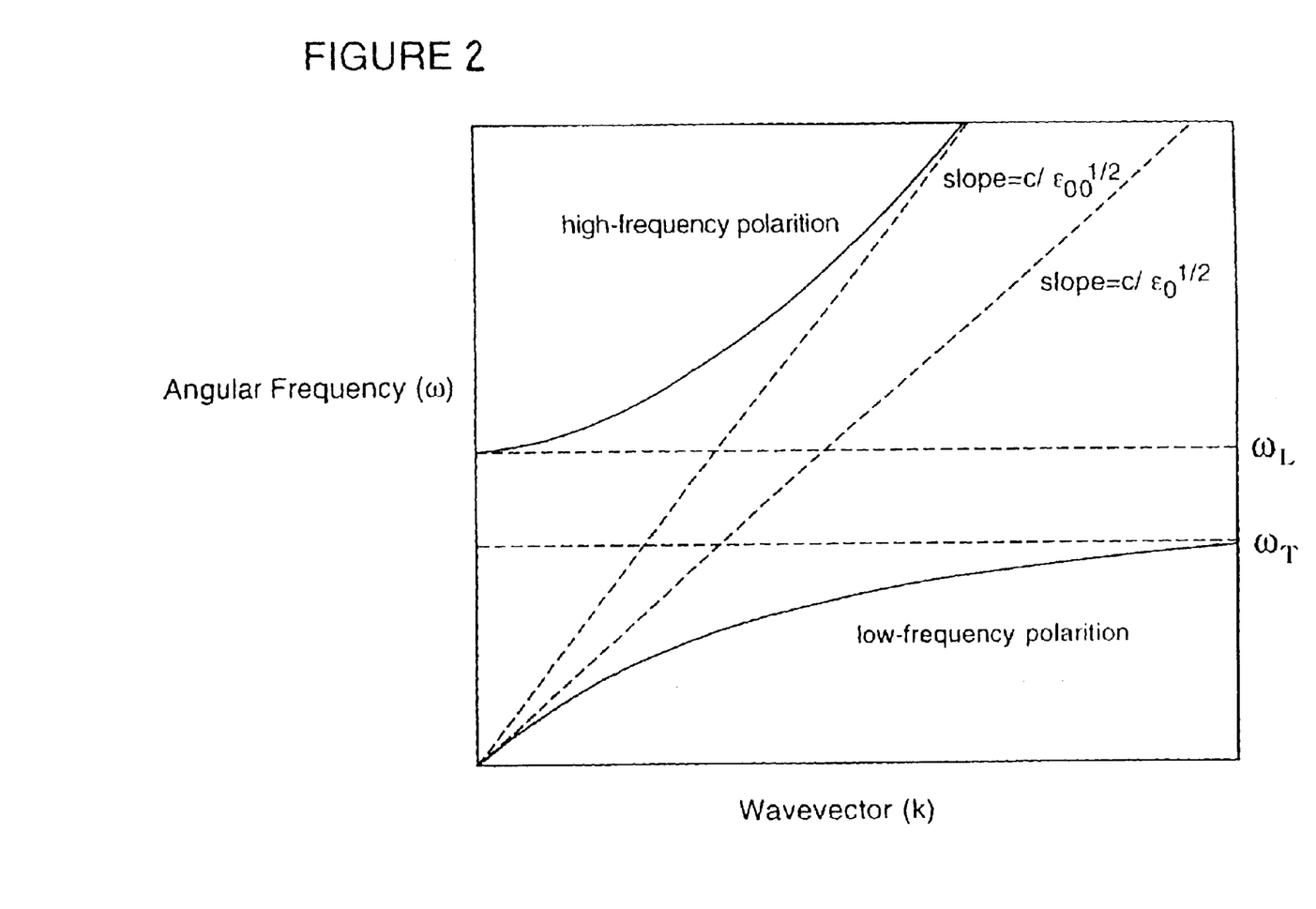
FIG. 2 is a graph of polariton dispersion curve for a bulk material having one polar mode.

FIG. 2 shows the dispersion curve of a polariton wave in a bulk material in which EM radiation couples to a single polar optic phonon. Coupling between the EM radiation and the polar optic phonon is strongest in a relatively low wavevector regime where the EM frequency is comparable to the frequency of the optic phonon. As shown in FIG. 2, the coupling produces two polariton wave branches. The frequency of the lower branch approaches the transverse optic phonon frequency $\omega_T$ at large wavevector k, while the frequency of the higher branch approaches the longitudinal optic phonon frequency $\omega_L$ at small wavevector k. At large wavevectors k, the lower branch polariton predominantly involves only the material component and the upper branch predominantly involves only the EM component. For EM coupling to multiple polar, material modes, the polariton wave has multiple branches in the dispersion curve. Furthermore, in thin films, multilayer structures, and waveguides the polariton wave dispersion curves can be complicated, and are often determined numerically rather than analytically. In general, the polariton frequencies, typically of interest in the applications described herein are in the range of about 50 GHz to 10 THz.

Optical radiation in, e.g., the visible and near infrared regions, can generate the polariton waves through non-linear mechanisms such as impulsive stimulated Raman scattering (ISRS) and the electro-optic effect. Such mechanisms produce strong responses in ferroelectric materials such as, e.g., lithium tantalate (LiTaO$_3$), lead titanate (PbTiO$_3$), potassium niobate (KNBO$_3$), barium titanate (BaTiO$_3$), potassium tantalate niobate (KTa$_{1-x}$Nb$_x$O$_3$), PZT (KZr$_x$Ti$_{1-x}$O$_3$), and PLZT (K$_{1-y}$Li$_y$Zr$_x$Ti$_{1-x}$O$_3$) and, e.g., nonlinear optical crystals such as those in the KDP and KTP families and organic crystals such as DAST. In ISRS, an ultrashort (e.g., typically less than 1 ps) excitation pulse exerts a sudden ("impulse") force on those Raman-active modes whose vibrational periods are longer than the pulse duration. This sudden driving force produces time-dependent vibrational oscillations. See, for example, Y. Yan and K. A. Nelson (*J. Chem Phys.*, 87:6240, 1987. In non-centrosymmetric materials, the excited Raman-active vibrational modes can also be polar. In such cases, the time-dependent vibrational oscillations correspond to coherent oscillating dipoles, which generate and couple to electromagnetic radiation, thereby producing polariton waves. See, for example, T. P. Dougherty et al. (*J. Opt. Soc. Am. B.*, 9:2179, 1992). Like ISRS, the electro-optic effect is an impulsive mechanism that uses excitation pulses whose coherent bandwidth is greater than the desired polariton frequency. In the electro-optic effect, for example, a non-linear response in the material rectifies an ultrashort visible excitation pulse to produce a short burst of terahertz radiation that couples to polar material modes, thereby forming a polariton wave. Depending on the excitation geometry, both ISRS and the electro-optic mechanisms may contribute to the generation of the polariton wave.

Figure 3A:
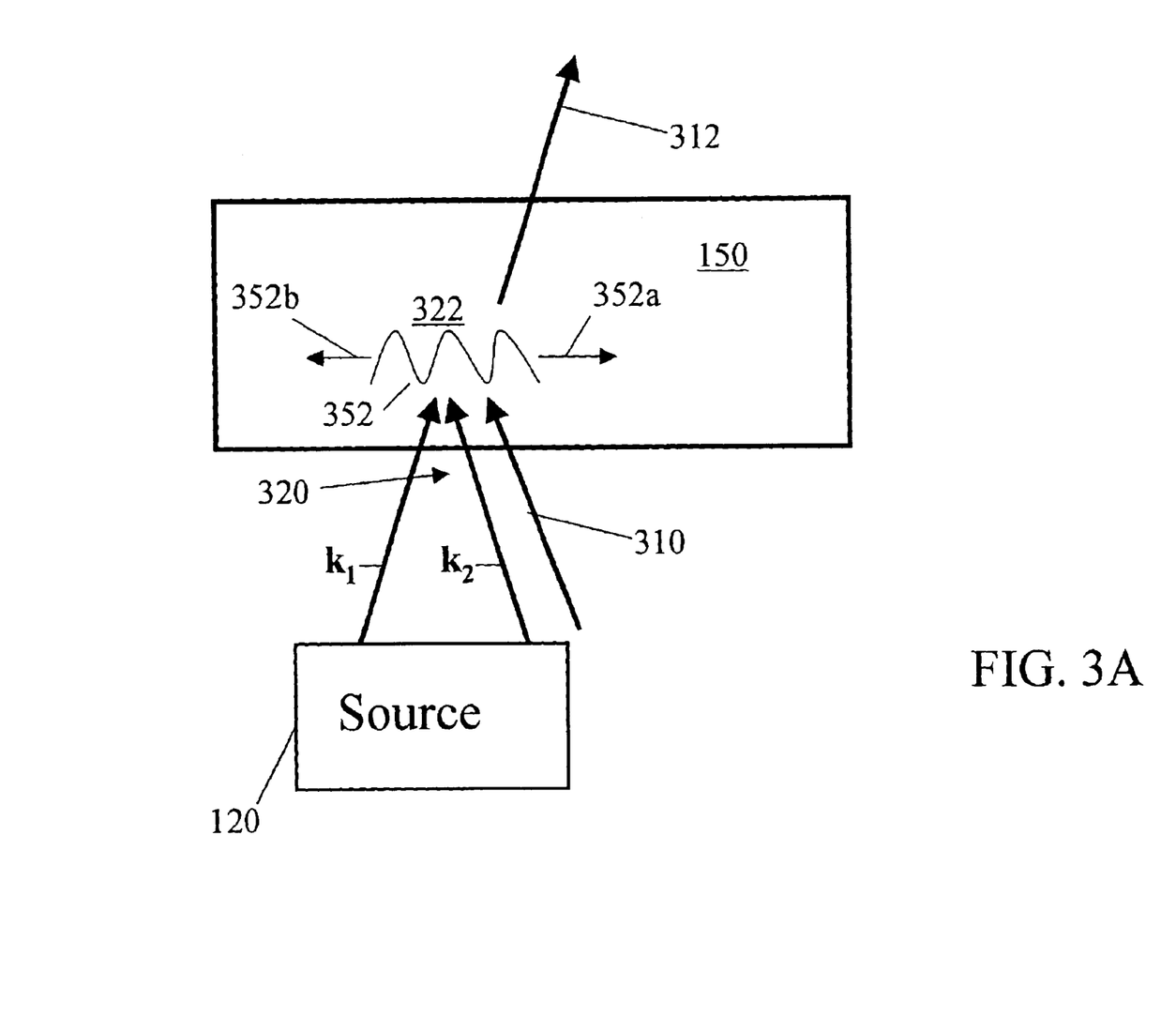
FIGS. 3A and 3B are schematic diagrams showing polariton excitation geometries.

One excitation geometry is shown in FIG. 3A. Source 120 directs two excitation pulses 320 having wavevectors $k_1$ and $k_2$, respectively, to cross in a first region 322 of the material 150. The crossed excitation pulses interfere with one another to form a sinusoidal excitation pattern having a period equal to $2\pi/q$, where q equals the absolute value of $k_1-k_2$. When the excitation pulses have durations shorter than the inverse of the polariton frequency corresponding to the wavevector $k_1-k_2$, the excitation pulses impulsively excite polariton waves 352 at that frequency. Because the spotsizes of pulses 320 in material 150 are finite, the excitation intensity pattern spans a range of wavevectors and pulses 320 generate polariton waves 352 with a corresponding set of wavevectors. Accordingly, excitation pulses 320 produce two counter-propagating polariton wavepackets 352a and 352b, which have transverse central wavevector components $+(k_1-k_2)$ and $-(k_1-k_2)$, respectively. The frequency $\Omega$ of the polariton wave is given by the dispersion curve of the polariton wave in material 150, i.e., $\Omega[+/-(k_1-k_2)]$. For example, if material 150 were a bulk material and there was only one relevant polar mode, the dispersion curve would look similar to FIG. 2. Because the polariton frequency depends on the wavevector content of the excitation field, the polariton frequency can be selected by generating the appropriate excitation field. For example, changing the crossing angle of excitation pulses 320 changes the spatial period of the impulsive excitation pattern in material 150 and thereby changes the frequency of the polariton wavepackets generated by the excitation pattern.

The polariton waves produce a time-varying change in the refractive index of material 150 corresponding to their respective wavevectors. For example, when the polariton wavepackets overlap, they form a transient grating. As shown in FIG. 3A, an input signal beam 310 is incident on the transient grating at the phase-matching angle for coherent scattering (i.e., diffraction) by polariton waves 352. As a result, at least a part of input beam 310 is coherently scattered to form a wavelength-shifted beam 312 whose frequency is shifted by the polariton frequency. Because the input signal beam is incident on the crystalline region that is irradiated by the excitation pulses, it interacts with both counter-propagating polariton wavepackets. As a result, wavelength-shifted beam 312 includes both up-shifted and down-shifted frequency components. In other embodiments, input signal beam 310 can be directed to material 150 outside of the excitation region to interact with one or the other of the polariton wavepackets after it propagates beyond the excitation region. In such embodiments, wavelength-shifted beam 312 includes only one frequency-shifted component. Whether that component is up-shifted or down-shifted depends on the phase-matching geometry. Sometimes the latter embodiment is preferred because input signal beam 310 is spatially separated from excitation pulses 320 thereby preventing direct nonlinear interactions between them. Similarly, input signal beam 310 may be temporally delayed relative to the excitation pulses to prevent such nonlinear interactions. The amount of shifted light in beam 312 depends on the coherent scattering efficiency, which in turn depends on the excitation amplitude, the interaction length, and the polariton differential polarizability. As described above, the frequency shift may be controlled by changing the polariton wavevector excited by pulses 320, e.g., by changing the angle between the pulses.

The crossed beams in FIG. 3A may generated from a common source beam using beam splitters and mirrors. Alternatively, the common source beam may be directed through a diffraction mask to generate multiple diffracted beams, some of which may be imaged onto the material to form the optical excitation pattern.

Figure 3B:
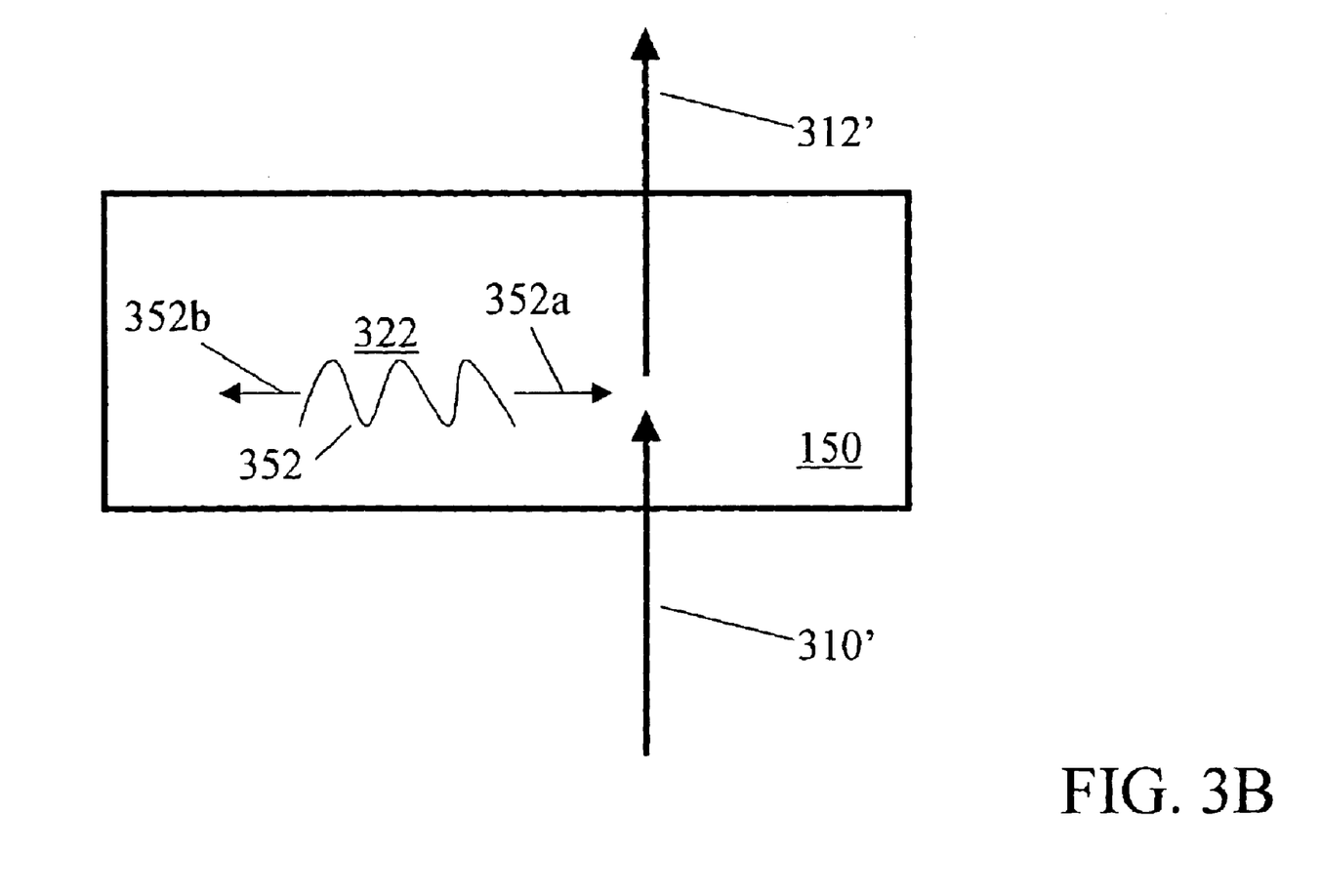

In other embodiments, the phase-matching geometry shown in FIG. 3A is not necessary. For example, when the magnitude of the polariton wavevector is small compared to the inverse of the transverse dimension of the input beam, there is no diffraction of input signal beam 310. Nonetheless, the polariton waves still produce a time-varying index of refraction in the material that can frequency shift components of an input signal beam 310. Referring to FIG. 3B, for example, input signal beam 310' is directed to material 150 to interact with polariton wavepacket 352a and emerge as wavelength-shifted beam 312' that includes at least one component shifted by the polariton frequency. Furthermore, a phase-matching geometry is not necessary when the thickness of the interaction region is small compared to a phase-mismatch distance corresponding to the inverse of the polariton wavevector.

In addition to crossed-beam excitation, the polariton waves can also be excited using a single beam. For example, a tightly-focused, ultrashort excitation pulse can generate polariton waves through difference frequency mixing among the frequency components of the large bandwidth (i.e., ultrashort) pulse. However, in this case, the difference frequency components correspond to difference wavevectors present in the tightly-focussed pulse rather than from two crossed beams. As a result, exciting the crystal with a single pulse typically generates relatively low wavevector, polariton waves, with the range of wavevectors inversely proportional to the spot size of the excitation pulse.

Furthermore, in additional embodiments, the optical excitation profile can have a more complicated spatial profile. In general, for bulk materials, the generated polariton waves correspond to the wavevector content of the spatial intensity profile of the optical excitation radiation, subject to symmetry and pulse duration considerations. Accordingly, the spatial profile is selected to include wavevectors that correspond to the selected polariton wave frequency. The optical excitation radiation may also have a temporal profile more complex than a single, ultrashort pulse, for example, it can include multiple pulses timed to resonantly enhance the polariton wave intensity. Whether by single or multiple pulse excitation, to impulsively excite such polariton waves the optical excitation radiation has a coherent bandwidth larger than the selected polariton frequency. For example, the bandwidth may correspond to an optical pulse shorter than about 20 ps, i.e., a bandwidth greater than about 50 GHz, and in some cases shorter than 100 fs, a bandwidth greater than about 10 THz. The central frequency for the optical radiation is typically in the ultraviolet, visible, or near-infrared, e.g., wavelengths in the range of about 300 nm to 2 microns. For references on generating shaped temporal and spatial excitation profiles that may be used to excite or image the polariton waves, see, e.g., U.S. Pat. Nos. 5,682,262 and 5,719,650, the contents of which are incorporated herein by reference.

In other embodiments, the polariton wave can be generated using frequency-domain, rather than time-domain excitation schemes. For example, rather than having difference-frequency mixing between components of an ultrashort pulse to excite a polariton wave, the difference frequency mixing between multiple, single frequency beams can excite the polariton wave through, e.g., stimulated Raman scattering (SRS) or other frequency-domain non-linear mixing mechanisms. For examples, two beams having frequencies $\omega_1$ and $\omega_2$, where $+/-(\omega_1-\omega_2)$ equals the frequency of the polariton wave, can be crossed with one another to excite the polariton wave.

In the non-linear optical generation of polariton waves described above, optical excitation field 122 propagates through a thickness of material 150 and generates polariton waves propagating substantially perpendicular to the direction of the optical excitation radiation. This results from the non-linear mixing of wavevector and frequency components of the optical excitation radiation. It is noted, however, that because the optical excitation radiation generates polariton waves as it travels throughout the thickness of the material, there is also a small forward wavevector component to the overall polariton response.

Figure 4:
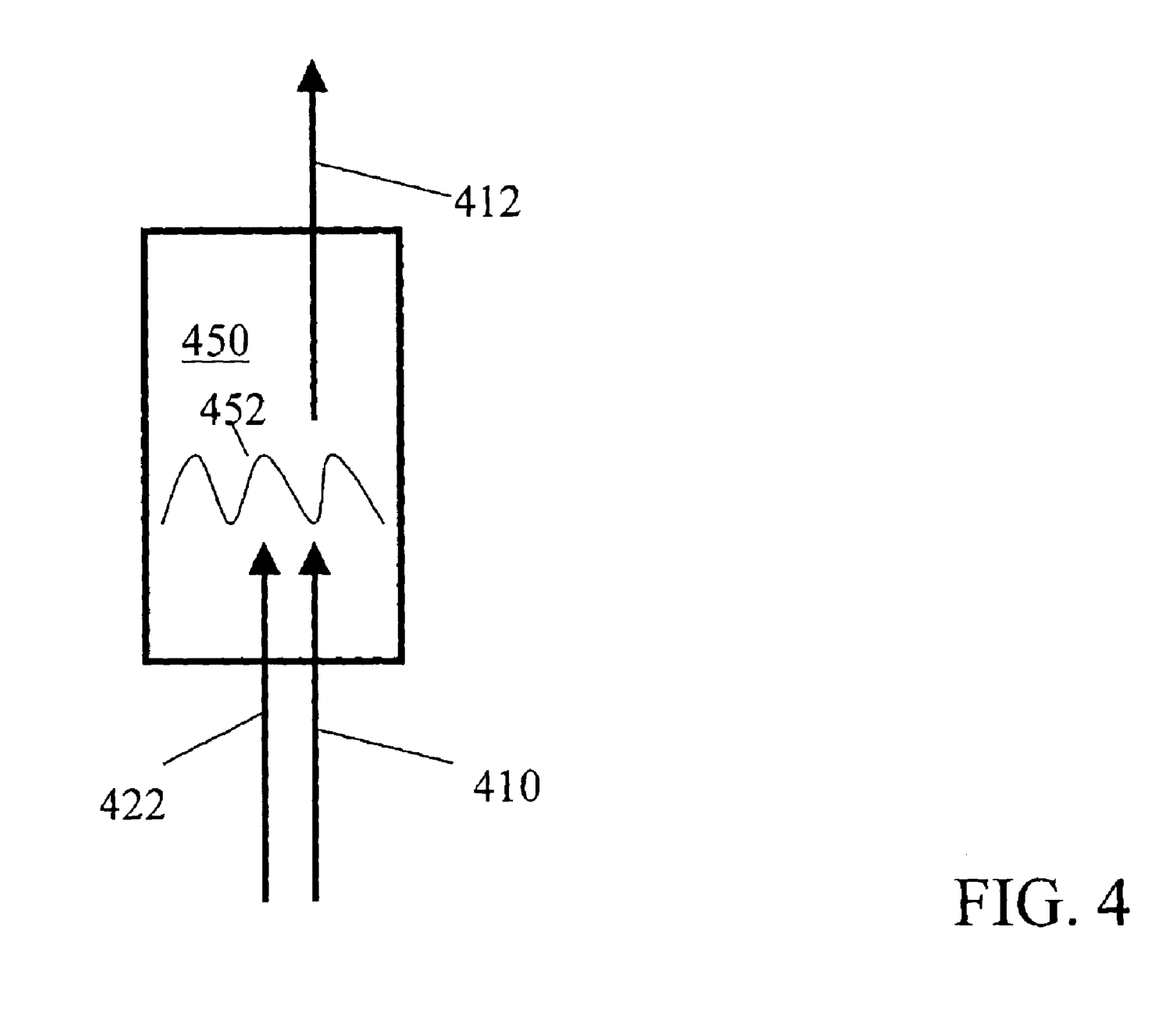
FIG. 4 is a schematic diagram of an embodiment of the wavelength-shifting method that uses a resonant polariton cavity.

In a further embodiment shown in FIG. 4, an excitation field 422 excites a polariton wave 452 in a material 450 whose transverse dimension is limited (e.g., on the order of tens or hundreds of microns). Excitation field 422 may be result from a single beam, crossed beams, or a tailored spatial profile, as described above. The limited dimension partially or fully confines polariton wave 452, which is partially or fully reflected from the transverse edges of material 450. Because of the confinement, polariton waves whose frequency is the fundamental or harmonic of the inverse of the round trip time in the material are resonantly enhanced. Thus, material 450 is a cavity resonator for a subset of polariton frequencies. Provided excitation field 422 includes at least one wavevector component corresponding to one of the resonant modes, the intensity of that resonant mode can be built up through prolonged excitation, while non-resonant modes are discriminated against. During or following optical excitation of the resonant polariton mode, input signal beam 410 interacts with the polariton wave and emerges as wavelength-shifted beam 412, which includes components both up-shifted and down-shifted by the frequency of the resonant polariton mode. Accordingly, the frequency shift can be selected by selecting the transverse dimension of material 450, which defines the resonant mode frequencies.

Furthermore, additional embodiments may include an array of such polariton resonators, e.g., formed on a single substrate. The array includes resonators defining different resonant mode frequencies. In such embodiments, the polariton wave frequency corresponding to a desired frequency shift is selected by directing the excitation field and input signal beam to the resonator cavity corresponding to the desired polariton wave frequency. In some embodiments, the resonator array may be constructed as a spatially periodic sequence of identical resonators, which are then provided with irregularities (e.g., doped with impurities) to produce a particular resonant frequency for each resonator. The otherwise identical set of resonators may further be constructed to form a photonic bandgap material, which restricts the polariton wavelengths and frequencies and thereby restricts the wavelength shifts that can be imparted to the input optical signal. Photonic bandgap materials are discussed, for example, in U.S. Pat. No. 5,999,308 entitled "Method and systems for introducing electromagnetic radiation into photonic crystals," the contents of which are incorporated herein by reference.

Referring again to FIG. 1, system 100 may also include a bias source 130 coupled to electrodes on opposite sides of material 150. During operation, bias source 130 introduces a DC bias voltage across material 150 to dynamically adjust the polariton wave frequency $\Omega$. The DC bias can be used in any of the embodiments described above, e.g., when material 150 is a bulk crystalline material and when its transverse dimension is small enough to define a cavity resonator. In particular, the DC bias can be applied to each of one or more resonators in a polariton resonator array. In any of these cases, the size of the DC bias can be used to tune the polariton wave frequency by altering the polar properties of material 150. Accordingly, the frequency-shift imparted to input signal beam 110 can be selectably tuned by varying the DC bias. Furthermore, in additional embodiments implementing the DC bias, material 150 may be of the type that would not support polariton waves in the absence of the DC bias. In such cases, the frequency shifting could be turned "on" and "off" by controlling the DC bias.

In additional embodiments, the polariton wave can be generated using methods different from non-linear optical excitation of the polariton supporting material. For example, low frequency EM radiation, e.g., 50 GHz to 10 THz, that propagates into material 150 directly excites the polar material modes that form the material component of the polariton wave, therefore this EM radiation propagates within material 150 as a polariton wave. Similarly, a high-bandwidth electrical signal in a conductor adjacent a dielectric portion of material 150 can drive the polar, material modes in the material, thereby producing the polariton wave. The electrical pulse can be generated by high-bandwidth electronics or by a separate electro-optical generation mechanism, such as a Josephson junction.

A wide range of material and material structures could be used to form the material that supports the polariton wave and its interaction with the input beam. The material may include a ferroelectric material such as, e.g., lithium tantalate ($LiTaO_3$), lead titanate ($PbTiO_3$), potassium niobate ($KNBO_3$), barium titanate ($BaTiO_3$), potassium tantalate niobate ($KTa_{1-x}Nb_xO_3$), PZT ($KZr_xTi_{1-x}O_3$), and PLZT ($K_{1-y}Li_yZr_xTi_{1-x}O_3$), nonlinear optical crystals such as, e.g., those in the KDP and KTP families and organic crystals such as DAST, and semiconductors such as, e.g., GaAs and InP. Such materials may be used as a bulk material, a thin film material including, e.g., a polariton resonater, or a patterned material including, e.g., a polariton cavity resonator or resonator array, a waveguide, a photonic bandgap material, or a multiple-quantum well structure. For example, lithium tantalite films may be deposited through pulsed laser deposition (PLD) or other such methods.

Moreover, the material supporting the polariton may be part of a hybrid structure. For example, the wavelength-shifting system can be an integrated structure with the input signal beam propagating to the polariton interaction region through a photonic bandgap material or a waveguide, such as a channel waveguide in planar waveguide circuit.

In another hybrid structure example, a material capable of supporting a polariton wave, e.g., a lithium tantalite crystal, can be positioned in close proximity to a second (substrate) material such as a biased GaAs wafer. When the GaAs is exposed to pulsed radiation, it emits far-infrared (THz frequency) radiation. Such radiation then enters the lithium tantalite crystal, forming the polariton wave described above for dynamic wavelength shifting. As described above, crossed excitation pulses, a single excitation pulse, or a sequence of pulses may be used to excite the GaAs wafer. Furthermore, the lithium tantalite crystal or the substrate may be a thin film, a polariton resonator, or may have a bias voltage applied to it.

In additional embodiments of the invention, the input signal beam can propagate in a material having a region proximate to, but different from, the material supporting the polariton wave. In such cases, the polariton wave interacts with input signal beam because its EM component extends into the signal beam material and dynamically polarizes the proximate region, thereby imparting a frequency shift to the input signal beam propagating therein. For example, the input signal beam may propagate in a semiconductor sample that is in close proximity (e.g., within the polariton wavelength) to a ferroelectric polariton host crystal. Moreover, the polariton wave can be generated inside one material, and then propagate into another material within which the input signal beam propagates. In any of such embodiments, the input signal beam may propagate in an optical waveguide or photonic bandgap material that is embedded within or in proximity to the polariton host crystal.

In general, the methods and systems described herein for dynamically shifting the frequency of an EM beam using a polariton wave can be applied to any application where it is desired to shift the frequency of the EM beam. One particular application is shifting the frequency of an input beam carrying a telecommunication signal. Such shifting may be desired to optimize the bandwidth utilization of an optical network. The telecommunication signal beam may have modulated intensity profile, such as sequence of pulses representing a digital bit stream. Alternatively, or in addition, the beam may have a modulated phase profile to carry the information. Furthermore, the coherent bandwidth of the telecommunication signal beam is typically less than the wavelength shift. Other applications of the invention include frequency shifting in the fields of spectroscopy, metrology, photomedicine, and laser-based materials processing.

Other aspects, advantages, and modifications are within the scope of the following claims.

What is claimed is:

1. A method for shifting the frequency of an electromagnetic beam carrying a telecommunication signal, the method comprising:
   generating in a material a polariton wave having a polariton wave frequency; and
   directing the beam carrying the telecommunication signal to interact with the polariton wave and cause at least portion of the beam to shift in frequency by an amount corresponding to the polariton wave frequency.

2. The method of claim 1 further comprising selecting the polariton wave frequency based on a desired frequency shift for the electromagnetic beam.

3. The method of claim 1 further comprising adjusting the polariton wave frequency to cause a corresponding adjustment to the frequency shift.

4. The method of claim 3, wherein the adjustment of the polariton wave frequency comprises applying an external electric field to the material.

5. The method of claim 1, further comprising adjusting the frequency shift by repeating the generating and directing steps for a polariton wave having a different polariton wave frequency corresponding to the adjusted frequency shift.

6. The method of claim 1, further comprising allowing the polariton wave to propagate in the material prior to its interaction with the electromagnetic beam.

7. The method of claim 1, further comprising introducing a delay between the generation of the polariton wave and its interaction with the electromagnetic beam.

8. The method of claim 1, wherein the generation of the polariton wave is selected to occur at a first spatial region of the material and the interaction between the polariton wave and the electromagnetic beam is selected to occur at a different, second spatial region of the material.

9. The method of claim 1, wherein the material defines a polariton wave cavity resonant with the polariton wave frequency.

10. The method of claim 9, further comprising selecting the polariton wave frequency by applying an external electric field to the material to adjust the effective cavity length of the resonant cavity.

11. The method of claim 9, further comprising resonantly pumping the cavity to increase the intensity or frequency selectivity of the polariton wave.

12. The method of claim 9, wherein the material defines an array of cavities each having a resonant polariton wave frequency.

13. The method of claim 12, further comprising selecting a desired polariton wave frequency, and wherein the generation of the polariton wave comprises generating the polariton wave in the cavity corresponding to the desired polariton wave frequency.

14. The method of claim 9, wherein the material comprises at least one constituent material having a transverse dimension sufficient to define the resonant cavity.

15. The method of claim 1, wherein the frequency-shift equals the polariton wave frequency or a harmonic of the polariton wave frequency.

16. The method of claim 1, wherein the frequency-shift is selected to be positive.

17. The method of claim 1, wherein the frequency-shift is selected to be negative.

18. The method of claim 1, wherein the electromagnetic beam carries the telecommunication signal as a modulated intensity profile or a modulated phase profile.

19. The method of claim 1, wherein the electromagnetic beam carrying the telecommunication signal has a coherent bandwidth that is less than the frequency shift.

20. The method of claim 1, wherein the electromagnetic beam comprises pulsed electromagnetic radiation.

21. The method of claim 1, wherein the electromagnetic beam comprises continuous-wave (cw) or quasi-cw electromagnetic radiation.

22. The method of claim 1, wherein the electromagnetic beam is directed to the material by an optical waveguide.

23. The method of claim 1, wherein the polariton wave frequency is in the range of about 50 GHz to about 10 THz.

24. The method of claim 1, wherein the electromagnetic beam has a central wavelength in the range of about 300 nm to 2.5 microns.

25. The method of claim 1, wherein the material comprises a crystalline material.

26. The method of claim 25, wherein the material comprises a ferroelectric or a semiconductor crystal.

27. The method of claim 1, wherein the material comprises a non-centrosymmetric material.

28. The method of claim 1, wherein the generation of the polariton wave comprises optically exciting the material.

29. The method of claim 28, wherein the optical excitation of the polariton wave comprises directing at least one pulse of optical radiation to the material, wherein the optical pulse has a pulse duration shorter than the inverse of the polariton wave frequency.

30. The method of claim 29, wherein the pulse duration is shorter than 10 ps.

31. The method of claim 28, wherein the optical excitation of the polariton wave comprises simultaneously directing at least two optical excitation beams to overlap in the material, wherein any two of the optical excitation beams differ in frequency by an amount equal to the polariton wave frequency.

32. The method of claim 28, wherein the optical excitation of the polariton wave comprises forming an optical excitation grating pattern in the material.

33. The method of claim 32, wherein the formation of the optical excitation grating pattern comprises crossing a pair of optical excitation beams on the material.

34. The method of claim 32, wherein the formation of the optical excitation grating pattern comprises directing optical radiation to a mask and imaging at least a portion of the masked light into the material.

35. The method of claim 32, further comprising adjusting the period of the optical excitation grating pattern to select the polariton wave frequency.

36. The method of claim 28, wherein the optical excitation of the polariton wave comprises coupling electromagnetic radiation at the polariton wave frequency into the material.

37. The method of claim 1, wherein the generation of the polariton wave comprises directing at least one electrical pulse to the material, wherein the electrical pulse has a pulse duration shorter than the inverse of the polariton wave frequency.

38. The method of claim 1, wherein the beam is directed into the material supporting the polariton wave to interact with the polariton wave.

39. The method of claim 1, wherein the beam is directed to a region proximate the material supporting the polariton wave to interact with the polariton wave.

40. A method for shifting the frequency of an electromagnetic beam, the method comprising:
   selecting a polariton wave frequency based on a desired frequency shift for the electromagnetic beam;
   optically exciting a material to generate a polariton wave having the selected polariton wave frequency; and
   directing the beam to interact with the polariton wave and cause at least portion of the beam to shift in frequency by an amount corresponding to the polariton wave frequency, wherein the optical excitation of the polariton wave comprises forming an optical excitation grating pattern in the material.

41. A method for shifting the frequency of an electromagnetic beam, the method comprising:

optically exciting a material to generate a polariton wave having a polariton wave frequency;

directing the beam to interact with the polariton wave and cause at least a portion of the beam to shift in frequency by an amount corresponding to the polariton wave frequency; and adjusting the polariton wave frequency to cause a corresponding adjustment to the frequency shift, wherein the optical excitation of the polariton wave comprises forming an optical excitation grating pattern in the material.

42. The method of claim 41, wherein the adjustment of the polariton wave frequency comprises applying an external electric field to the material.

43. The method of claim 41, wherein the material defines a polariton wave cavity resonant with the polariton wave frequency.

44. A method for shifting the frequency of an electromagnetic beam, the method comprising:

providing a material defining an array of polariton cavities having different resonant polariton wave frequencies;

generating a polariton wave in the cavity corresponding to a selected polariton wave frequency; and directing the beam to interact with the polariton wave and cause at least a portion of the beam to shift in frequency by an amount corresponding to the polariton wave frequency.

45. A method for shifting the frequency of an electromagnetic beam, the method comprising:

selecting a polariton wave frequency based on a desired frequency shift for the electromagnetic beam;

optically exciting a material to generate a polariton wave having the selected polariton wave frequency; and directing the beam to interact with the polariton wave and cause at least portion of the beam to shift in frequency by an amount corresponding to the polariton wave frequency, wherein the optical excitation of the polariton wave comprises directing at least one pulse of optical radiation to the material, and wherein the optical pulse has a pulse duration shorter than the inverse of the polariton wave frequency.

46. A method for shifting the frequency of an electromagnetic beam, the method comprising:

optically exciting a material to generate a polariton wave having a polariton wave frequency;

directing the beam to interact with the polariton wave and cause at least a portion of the beam to shift in frequency by an amount corresponding to the polariton wave frequency; and adjusting the polariton wave frequency to cause a corresponding adjustment to the frequency shift, wherein the optical excitation of the polariton wave comprises directing at least one pulse of optical radiation to the material, and wherein the optical pulse has a pulse duration shorter than the inverse of the polariton wave frequency.

47. The method of claim 46, wherein the adjustment of the polariton wave frequency comprises applying an external electric field to the material.

48. The method of claim 46, wherein the material defines a polariton wave cavity resonant with the polariton wave frequency.

* * * * *

UNITED STATES PATENT AND TRADEMARK OFFICE
CERTIFICATE OF CORRECTION

PATENT NO. : 6,717,717 B2
DATED : April 9, 2004
INVENTOR(S) : Keith A. Nelson

It is certified that error appears in the above-identified patent and that said Letters Patent is hereby corrected as shown below:

Title page,
Item [56], References Cited, U.S. PATENT DOCUMENTS, please insert
-- 3,590,267    6/1971    Patel       359/327
   3,590,268    6/1971    Patel       359/327
   3,639,775    2/1972    Patel       359/285
   2002/0179916 12/2002   Rufenacht   257/98 --

Column 11,
Line 9, insert -- a -- before "portion"

Column 12,
Line 65, insert -- a -- before "portion"

Column 14,
Line 4, insert -- a -- before "portion"

Signed and Sealed this

Thirtieth Day of November, 2004

JON W. DUDAS
*Director of the United States Patent and Trademark Office*